United States Patent
Itoh et al.

(10) Patent No.: US 9,401,081 B2
(45) Date of Patent: Jul. 26, 2016

(54) VEHICLE COMMUNICATION DEVICE

(71) Applicant: DENSO CORPORATION, Kariya, Aichi-pref. (JP)

(72) Inventors: Tetsuo Itoh, Anjo (JP); Kenichiro Sanji, Okazaki (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/431,330

(22) PCT Filed: Aug. 1, 2013

(86) PCT No.: PCT/JP2013/004671
§ 371 (c)(1),
(2) Date: Mar. 26, 2015

(87) PCT Pub. No.: WO2014/049929
PCT Pub. Date: Apr. 3, 2014

(65) Prior Publication Data
US 2015/0243156 A1    Aug. 27, 2015

(30) Foreign Application Priority Data

Sep. 28, 2012 (JP) .................... 2012-216778

(51) Int. Cl.
*G08B 21/18* (2006.01)
*H04W 4/00* (2009.01)
*H04W 84/00* (2009.01)

(52) U.S. Cl.
CPC .............. *G08B 21/182* (2013.01); *H04W 4/00* (2013.01); *H04W 84/005* (2013.01)

(58) Field of Classification Search
CPC ....... G08B 21/18; G08B 21/182; H04W 4/00; H04W 84/005
See application file for complete search history.

(56) References Cited

U.S. PATENT DOCUMENTS

| 2005/0283286 A1 | 12/2005 | Kanda et al. | |
| 2010/0003940 A1* | 1/2010 | Sanji | H04W 52/0225 455/254 |
| 2010/0232478 A1* | 9/2010 | Sanji | H04B 1/7073 375/150 |

(Continued)

FOREIGN PATENT DOCUMENTS

| JP | 2006033777 A | 2/2006 |
| JP | 2007076416 A | 3/2007 |

(Continued)

OTHER PUBLICATIONS

International Search Report and Written Opinion (in Japanese with English Translation) for PCT/JP2013/004671, mailed Oct. 29, 2013; ISA/JP.

*Primary Examiner* — Ted Wang
(74) *Attorney, Agent, or Firm* — Harness, Dickey & Pierce, P.L.C.

(57) ABSTRACT

A vehicle communication device includes: a communication line establishment device that establishes a communication line with a mobile communication terminal; a manipulation state information transmission device that transmits manipulation state information indicating a manipulation state of a vehicular accessory to the mobile communication terminal; an output timing specifying information generation device that generates output timing specifying information for specifying separation of the mobile communication terminal from the vehicle as an output timing for the mobile communication terminal to output the manipulation state information; and an output timing specifying information transmission device that transmits the output timing specifying information to the mobile communication terminal.

4 Claims, 12 Drawing Sheets

(56) References Cited

U.S. PATENT DOCUMENTS

2014/0074320 A1* 3/2014 Nishida ............... B60R 16/0232
701/2

FOREIGN PATENT DOCUMENTS

| JP | 2010205063 A | 9/2010 |
|---|---|---|
| JP | 2011255715 A | 12/2011 |

* cited by examiner

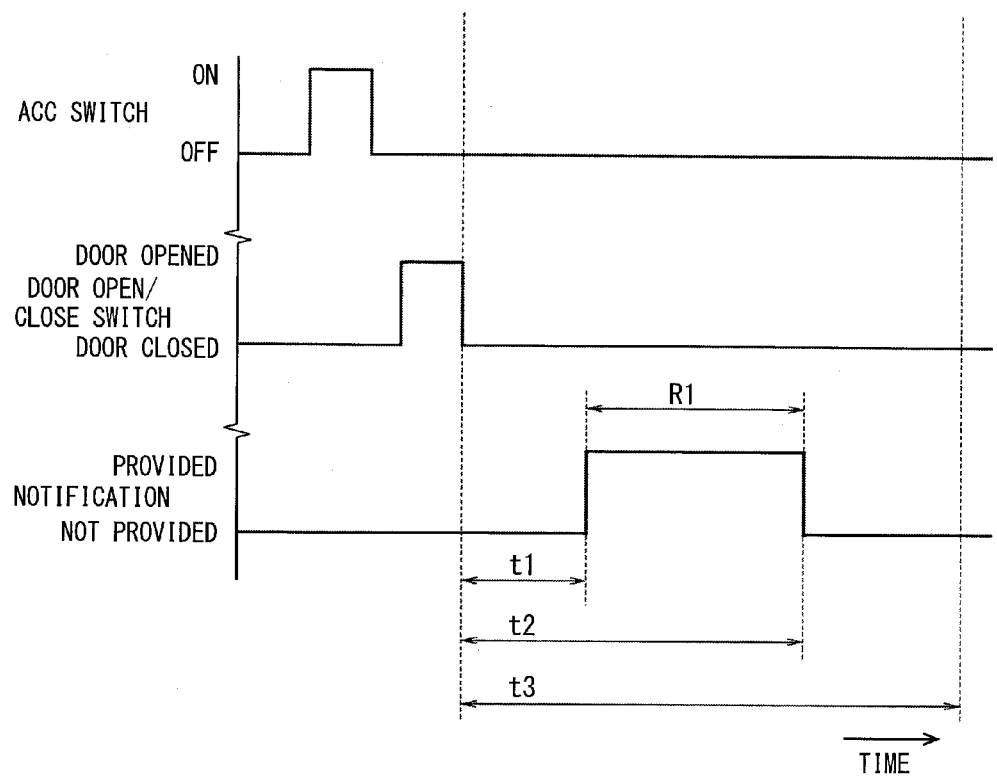

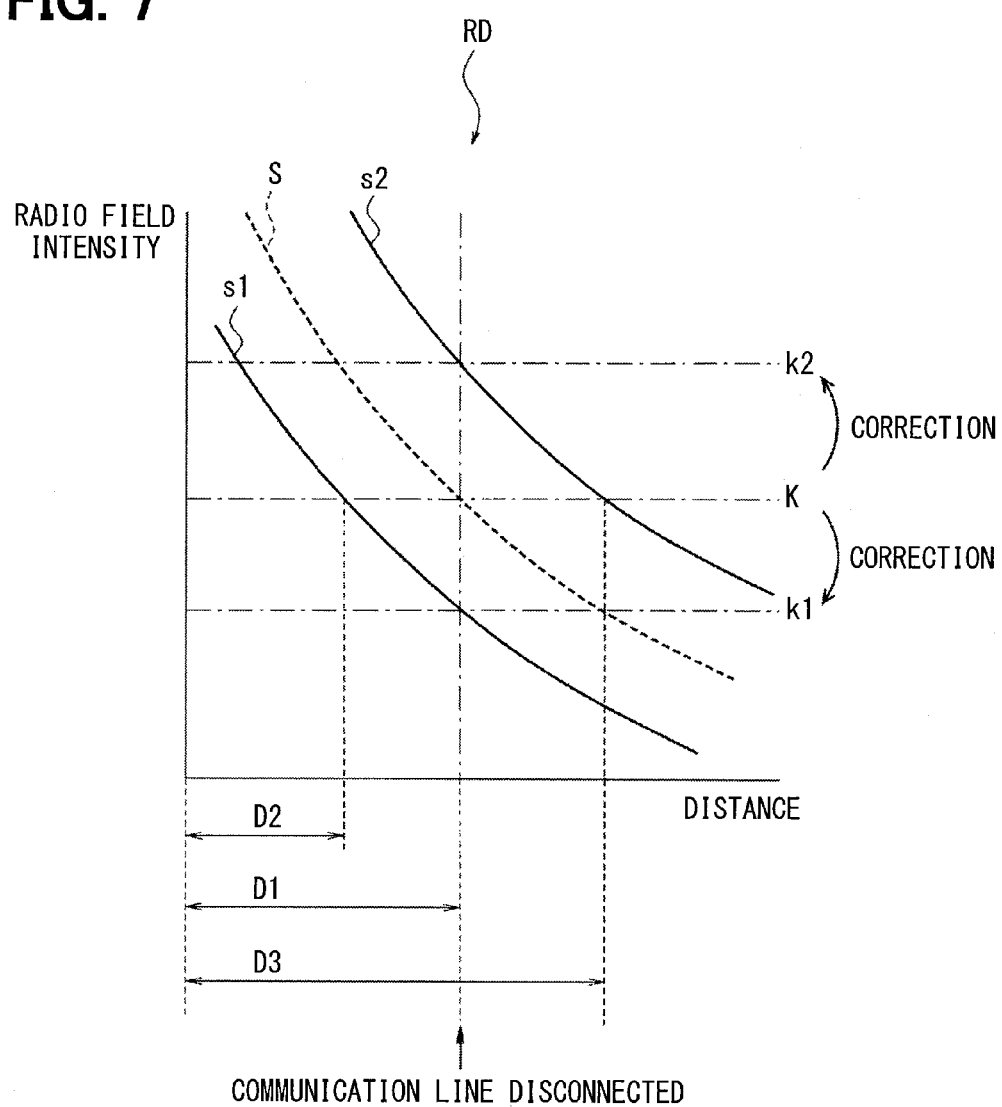

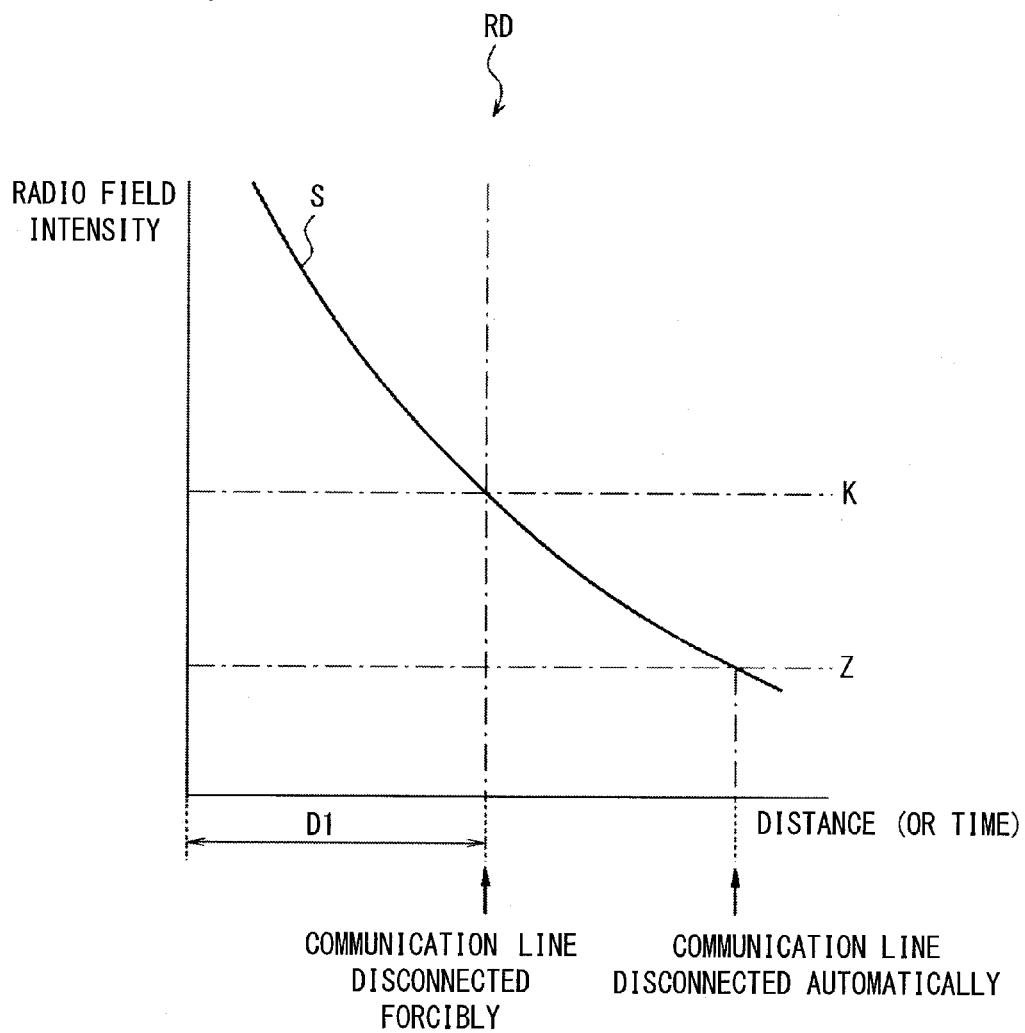

VEHICLE COMMUNICATION DEVICE

CROSS REFERENCE TO RELATED APPLICATIONS

This application is a U.S. National Phase Application under 35 U.S.C. 371 of International Application No. PCT/JP2013/004671 filed on Aug. 1, 2013 and published in Japanese as WO 2014/049929 A1 on Apr. 3, 2014. This application is based on and claims the benefit of priority from Japanese Patent Application No. 2012-216778 filed on Sep. 28, 2012. The entire disclosures of all of the above applications are incorporated herein by reference.

TECHNICAL FIELD

The present disclosure relates to a vehicle communication device.

BACKGROUND ART

There may be a case where the state of a stopped vehicle such as opening or closing a window, turning on or off a light, or locking or unlocking a door differs from a predetermined reference state. For example, patent literature 1 discloses the technology that transmits information indicating the vehicle state to a user's mobile terminal via a data relay station. This prior art can notify the user carrying a mobile terminal distant from the vehicle of failed manipulation on a vehicle window or door.

The above-mentioned prior art needs to use a mobile communication network via the data relay station and has a problem of increased communication costs. According to the above-mentioned prior art, the communication apparatus mounted on a vehicle is costly and the entire system including an intermediary data communication station is large-scale and costly.

Recently, there is a spreading use of the technology that uses a wireless communication line to communicably interconnect a vehicle communication device mounted on a vehicle with a mobile communication terminal carried by a user. The use of this technology can provide a less costly configuration that transmits information notifying failed manipulation on vehicular accessories (vehicle accessories) from the vehicle communication device to the mobile communication terminal without using the mobile communication network via the data relay station.

In this case, however, a distance between the vehicle communication device and the mobile communication terminal is much shorter than the prior art. This may cause a problem of accidentally transmitting information to the mobile communication terminal or disabling the communication due to a variation in the radio wave area for wireless communication depending on the circumference environment even if a user stays in the vehicle compartment or is located near the vehicle. When the user washes a vehicle, for example, the user may be located near the vehicle and may intentionally unlock the vehicle door. In such a case, it is inconvenient to notify a failure to lock the door. By contrast, it is also inconvenient to unsuccessfully notify the failed manipulation even though the user actually failed the manipulation.

PRIOR ART LITERATURES

Patent Literature

Patent Literature 1: JP-A-2006-33777 (corresponding to US 2005/0283286)

SUMMARY OF INVENTION

It is an object of the present disclosure to provide a vehicle communication device capable of allowing a mobile communication terminal to notify a user of failed manipulation on accessories or a manipulation state at proper timings when the vehicle communication device is mounted on a vehicle and transmits information for notifying the failed manipulation on accessories or the manipulation state to the mobile communication terminal carried by the user via a wireless communication line.

According to an aspect of the present disclosure, a vehicle communication device includes: a communication line establishment device that establishes a communication line with a mobile communication terminal; a manipulation state information transmission device that transmits manipulation state information indicating a manipulation state of a vehicular accessory to the mobile communication terminal, with which the communication line is established by the communication line establishment device; an output timing specifying information generation device that generates output timing specifying information for specifying separation of the mobile communication terminal from the vehicle as an output timing for the mobile communication terminal to output the manipulation state information; and an output timing specifying information transmission device that transmits the output timing specifying information generated by the output timing specifying information generation device to the mobile communication terminal.

The above-mentioned vehicle communication device transmits output timing specifying information to the mobile communication terminal while the communication line is established. The mobile communication terminal outputs an accessory manipulation state at a timing specified in the output timing specifying information, namely, at an "instant to separate the mobile communication terminal from the vehicle." The mobile communication terminal outputs a state of manipulation on a vehicular accessory based on the manipulation state information, namely, notifies a user of failed manipulation (manipulation state) on a vehicular accessory at the given timing. This timing can be defined as an "instant to separate the mobile communication terminal from the vehicle," namely, when the user carrying the mobile communication terminal appropriately separates from the vehicle. The user can be notified of an accessory manipulation state at appropriate timing. Based on the notified manipulation state, the user can determine whether or not the manipulation on the accessory failed.

BRIEF DESCRIPTION OF DRAWINGS

The above and other objects, features and advantages of the present disclosure will become more apparent from the following detailed description made with reference to the accompanying drawings. In the drawings:

FIG. 6 is a timing chart illustrating an example of relationship among operation states of an ACC switch and a door lock actuator, and timing to notify an accessory manipulation state;

FIG. 7 is a graph illustrating correction of a threshold value for correlation data;

FIG. 12 is a graph illustrating example relationship between a threshold value to forcibly disconnect a communication line and a threshold value to automatically disconnect the same.

EMBODIMENTS FOR CARRYING OUT INVENTION

Figure 1:
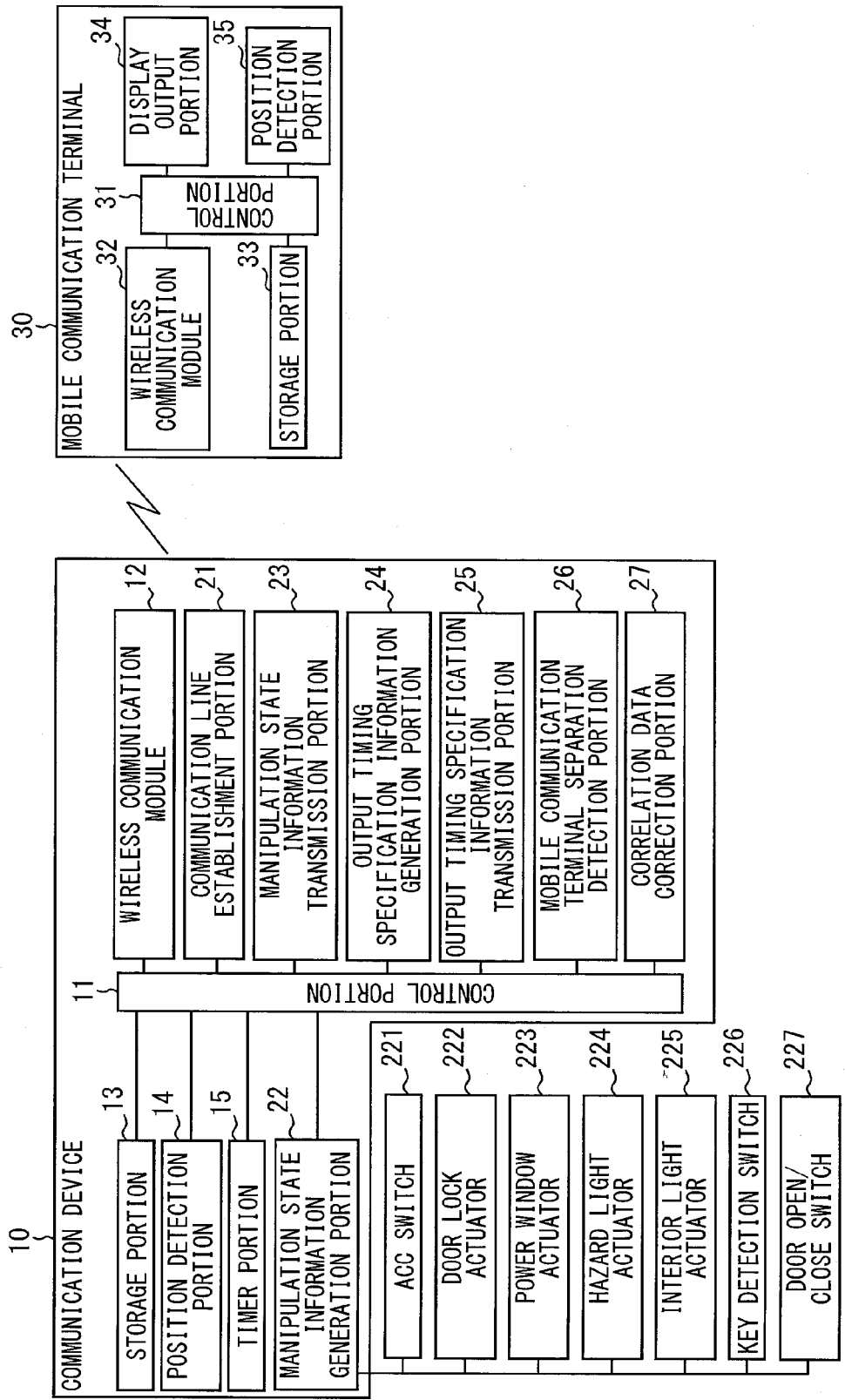
FIG. 1 is a functional block diagram schematically illustrating configurations of a vehicle communication device and a mobile communication terminal according to an embodiment.

The following describes an embodiment of the vehicle communication device with reference to the accompanying drawings. As illustrated in FIG. 1, a vehicle communication device 10 (hereinafter referred to as a communication device 10) includes a vehicle-mounted navigation system or a standalone, dedicated control instrument, for example. A mobile communication terminal 30 is brought into a vehicle compartment or is located near the communication device 10, for example. The communication device 10 automatically or manually, by user manipulation, establishes a wireless communication line connected to the mobile communication terminal 30. The communication device 10 and the mobile communication terminal 30 are thereby communicably connected with each other.

The communication device 10 includes a control portion 11, a wireless communication module 12, a storage portion 13, a position detection portion 14, and a timer portion 15. The control portion 11 includes a known microcomputer having a CPU, RAM, ROM, and an I/O bus (unshown). The control portion 11 controls entire operation of the communication device 10 according to a computer program stored in the ROM or the storage portion 13. The control portion 11 executes the computer program to virtually implement a communication line establishment portion 21, a manipulation state information generation portion 22, a manipulation state information transmission portion 23, an output timing specification information generation portion 24 (hereinafter referred to as a "specification information generation portion 24"), an output timing specification information transmission portion 25 (hereinafter referred to as a "specification information transmission portion 25"), a mobile communication terminal separation detection portion 26 (hereinafter referred to as a "separation detection portion 26"), and a correlation data correction portion 27 as software. The communication line establishment portion 21, the manipulation state information generation portion 22, the manipulation state information transmission portion 23, the specification information generation portion 24, the specification information transmission portion 25, the separation detection portion 26, and the correlation data correction portion 27 may be implemented as hardware integrated with the control portion 11.

The mobile communication terminal 30 includes a wireless communication module 32 to establish a communication line. When a communication line is established, the wireless communication module 12 uses the communication line to perform various types of communication with the mobile communication terminal 30. The storage portion 13 includes a storage medium such as a hard disk drive, a memory card, or a flash memory card and contains a storage area to store various types of information. In this case, the storage portion 13 contains at least a storage area to store manipulation state information to be described in detail later. The storage portion 13 also stores correlation data RD illustrated in FIG. 2, for example.

Correlation data RD shows correlation between a distance and a radio field intensity for wireless communication between the communication device 10 and the mobile communication terminal 30. Namely, increasing the distance decreases the radio field intensity. The distance between the communication device 10 and the mobile communication terminal 30 can be converted into the time (elapsed time) elapsed from the time to separate the mobile communication terminal 30 from the vehicle under the condition that a user carrying the mobile communication terminal 30 moves away from the vehicle at average travel speed V in a direction separating from the vehicle.

The position detection portion 14 includes various unshown sensors such as a geomagnetism sensor, a gyroscope, a vehicle speed sensor, and a GPS receiver according to known technologies. The position detection portion 14 mutually complements detection signals supplied from the sensors to acquire the vehicle position information. The position detection portion 14 outputs the acquired vehicle position information to the control portion 11. The control portion 11 performs a so-called navigation process based on the vehicle position information acquired by the position detection portion 14 and a guide route retrieved by an unshown route retrieval portion.

The timer portion 15 includes an unshown timer circuit and performs a timer process based on a timer instruction signal supplied from the control portion 11. In this case, the timer portion 15 measures the time elapsed from when the control portion 11 detects "separation of the mobile communication terminal 30 from the vehicle." The timer portion 15 also measures the time elapsed from when at least one of the accessories turns off. For example, the timer portion 15 measures various elapsed times such as the time elapsed from when the ACC switch 221 changes from "on-state" to "off-state" and a door lock actuator 222 changes from "locked door state" to "unlocked door state" and the time elapsed from when the ACC switch 221 changes from "on-state" to "off-state" and a door open/close switch 227 changes from "on-state" to "off-state." The timer portion 15 can measure several elapsed times in parallel.

The communication line establishment portion 21 corresponds to a communication line establishment device and performs a communication line establishment process that establishes a communication line connected to the mobile communication terminal 30 via the wireless communication module 12. The communication line establishment portion 21 repeatedly performs the communication line establishment process at a short cycle in several seconds, for example. The communication line establishment portion 21 automatically establishes a communication line to the mobile communication terminal 30 that is available near the communication device 10. In this case, the communication line establishment portion 21 can establish a communication line to the mobile communication terminal 30 that is located within a range indicated by a radio field intensity distribution line corresponding to reference symbol a in FIG. 3. The radio field intensity distribution line a represents the distribution of radio field intensity S for wireless communication performed between the communication device 10 and the mobile communication terminal 30.

The manipulation state information generation portion 22 generates manipulation state information that indicates states of manipulation on various accessories (vehicle accessories) mounted on the vehicle. In this case, the communication device 10 including the manipulation state information generation portion 22 uses the manipulation state information generation portion 22 to connect with various drive devices and switches such as the ACC switch 221 (accessory switch), the door lock actuator 222, a power window actuator 223, a hazard light actuator 224, an interior light actuator 225, a key detection switch 226, and the door open/close switch 227 through so-called direct lines such as an in-vehicle LAN and a vehicle harness. The ACC switch 221 controls the on/off state of an unshown power supply circuit. The door lock actuator 222 controls locking/unlocking of a vehicle's door. The power window actuator 223 controls opening/closing of a vehicle's power window. The hazard light actuator 224 controls the on/off state of a vehicle's hazard light. The interior light actuator 225 controls the on/off state of an interior light in the vehicle compartment. The key detection switch 226 turns on when a key is inserted into the engine starter's key slot. The door open/close switch 227 turns on when the vehicle's door is open, and turns off when the vehicle's door is closed, for example.

The manipulation state information generation portion 22 specifies manipulation states of various accessories provided for the vehicle based on manipulation states of these drive devices and switches and generates manipulation state information indicating the specified manipulation states. For example, the manipulation state information generation portion 22 generates the manipulation state information indicating "unlocked state" as a manipulation state of the door as a vehicular accessory if the door lock actuator 222 operates to cause "unlocked door state." The manipulation state information generation portion 22 generates the manipulation state information indicating "locked state" as a manipulation state of the door if the door lock actuator 222 operates to cause "locked door state." The manipulation state information generation portion 22 generates the manipulation state information indicating "engaged key state" of the key inserted into the key slot as a manipulation state of the engine starter as a vehicular accessory if the key detection switch 226 operates to cause "on-state." The manipulation state information generation portion 22 generates the manipulation state information indicating "disengaged key state" of the key not inserted into the key slot as a manipulation state of the engine starter if the key detection switch 226 operates to cause "off-state." Though a detailed description is omitted, the manipulation state information generation portion 22 also generates the manipulation state information about other accessories (including those not illustrated) based on manipulation states of the actuators and switches.

The manipulation state information generation portion 22 repeatedly performs a process to generate the manipulation state information about various accessories at a short cycle in several seconds, for example. The manipulation state information generation portion 22 stores the generated manipulation state information in the storage portion 13. The storage portion 13 thereby always stores the up-to-date manipulation state information.

The manipulation state information transmission portion 23 corresponds to a manipulation state information transmission device. The manipulation state information transmission portion 23 allows the wireless communication module 12 to transmit the manipulation state information to the mobile communication terminal 30 whose communication line is established by the communication line establishment portion 21. While the communication line is established, the manipulation state information transmission portion 23 transmits the manipulation state information most recently stored in the storage portion 13, namely, the up-to-date manipulation state information, to the mobile communication terminal 30 at a short cycle in several seconds, for example, or each time the manipulation state information stored in the storage portion 13 is updated. The manipulation state information transmission portion 23 may transmit the manipulation state information temporarily stored in the ROM or RAM of the control portion 11, namely, the manipulation state information before stored in the storage portion 13, instead of the manipulation state information stored in the storage portion 13, to the mobile communication terminal 30.

The specification information generation portion 24 corresponds to an output timing specification information generation device. The specification information generation portion 24 generates output timing specification information that specifies the output timing to output the manipulation state information the mobile communication terminal 30 receives from the communication device 10, in other words, the notification timing to notify a user of accessory manipulation states from the mobile communication terminal 30. In this case, the specification information generation portion 24 generates the output timing specification information using "instant to separate the mobile communication terminal 30 from the vehicle" as output timing. As will be described in detail later, the separation detection portion 26 detects "separation of the mobile communication terminal 30 from the vehicle."

The specification information transmission portion 25 corresponds to an output timing specification information transmission device. While the communication line is established, the specification information transmission portion 25 allows the wireless communication module 12 to transmit the output timing specification information generated by the specification information generation portion 24 to the mobile communication terminal 30 at proper transmission timing.

Figure 2:
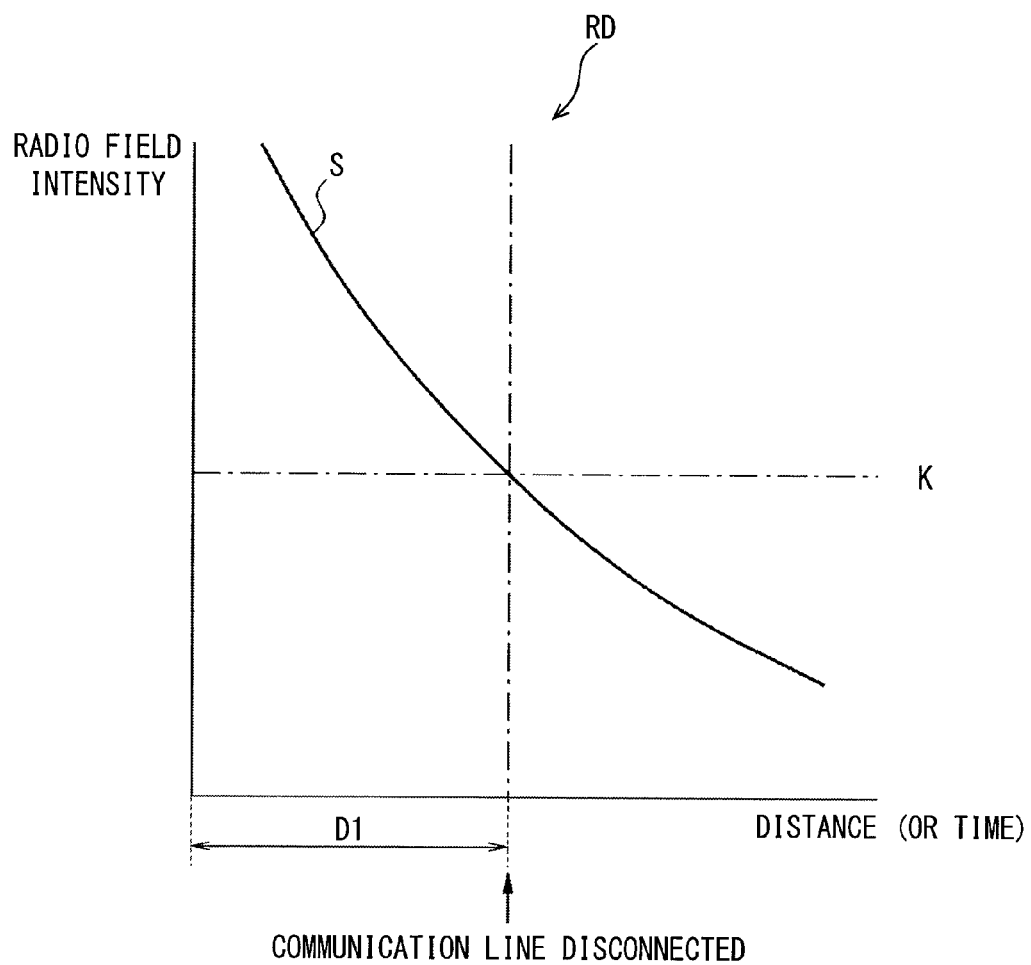
FIG. 2 is a diagram illustrating an example of correlation data.

The separation detection portion 26 corresponds to a detection device. The separation detection portion 26 is provided as a processing portion to detect "separation of the mobile communication terminal 30 from the vehicle." Basically, the separation detection portion 26 detects "separation of the mobile communication terminal 30 from the vehicle" when the communication line established with the mobile communication terminal 30 is disconnected. The control portion 11 forcibly disconnects the communication line based on correlation data RD. FIG. 2 illustrates radio field intensity S for the wireless communication performed between the communication device 10 and the mobile communication terminal 30, more specifically, between the wireless communication module 12 and the wireless communication module 32. Radio field intensity S decreases as the mobile communication terminal 30 carried by a user gradually separates from the vehicle. When radio field intensity S goes lower than a specified threshold value K, the control portion 11 forcibly disconnects the communication line. The threshold value K may be configured based on results of analyzing evaluation test data in the past or data indicative of variations in radio field intensities for wireless communication performed between the communication device 10 and the mobile communication terminal 30 in the past.

The output timing specification information generated by the specification information generation portion 24 specifies "instant to separate the mobile communication terminal 30 from the vehicle" as output timing. The communication device 10 detects "separation of the mobile communication terminal 30 from the vehicle." Therefore, the mobile communication terminal 30 cannot directly identify "separation of the mobile communication terminal 30 from the vehicle." To solve this problem, the specification information generation portion 24 supplies the output timing specification information with additional information indicating that the "instant to separate the mobile communication terminal 30 from the vehicle" basically denotes an "instant to forcibly disconnect the communication line." The specification information generation portion 24 may supply the output timing specification information with additional information indicating that the "instant to separate the mobile communication terminal 30 from the vehicle" denotes an "instant to automatically disconnect the communication line."

"Forcibly" disconnecting the communication line signifies that the communication device 10 or the mobile communication terminal 30 actively disconnects the communication line even though a sufficient radio field intensity is ensured to maintain the condition of the established communication line for wireless communication between the communication device 10 and the mobile communication terminal 30. The communication device 10 and the mobile communication terminal 30 assume the communication line to be "forcibly" disconnected when the communication line is disconnected even though a sufficient radio field intensity is ensured. "Automatically" disconnecting the communication line signifies that a sufficient radio field intensity cannot be ensured to maintain the condition of the established communication line for wireless communication between the communication device 10 and the mobile communication terminal 30 and it is impossible to continuously establish the communication line between the communication device 10 and the mobile communication terminal 30. The communication device 10 and the mobile communication terminal 30 assume the communication line to be "automatically" disconnected when the radio field intensity gradually decreases to disconnect the communication line.

The separation detection portion 26 can also detect "separation of the mobile communication terminal 30 from the vehicle" based on at least one of the radio field intensity for wireless communication between the communication device 10 and the mobile communication terminal 30, the vehicle position or an actual distance between the position of the communication device 10 and the position of the mobile communication terminal 30, and the time elapsed from when at least one of vehicular accessories turns off.

As will be described in detail later, the correlation data correction portion 27 corrects correlation data RD stored in the storage portion 13.

The following describes a configuration of the mobile communication terminal 30. The mobile communication terminal 30 includes a control portion 31, a wireless communication module 32, a storage portion 33, a display output portion 34, and a position detection portion 35. The control portion 31 includes a known microcomputer having a CPU, RAM, ROM, and an I/O bus (unshown). The control portion 31 controls entire operation of the mobile communication terminal 30 according to a computer program stored in the ROM or the storage portion 33.

When the communication line is established between the communication device 10 and the wireless communication module 12, the wireless communication module 32 performs various types of communication with the communication device 10 using the communication line. The storage portion 33 includes a storage medium such as a hard disk drive or a memory card and contains a storage area to store various types of information. In this case, the storage portion 33 contains at least a storage area to store the manipulation state information received from the communication device 10 and a storage area to store the output timing specification information.

While the communication line is established, the communication device 10 transmits the up-to-date manipulation state information at a short cycle in several seconds, for example, or each time the manipulation state information stored is updated. The control portion 31 rewrites the manipulation state information stored in the storage portion 33 each time the control portion 31 receives the manipulation state information via the wireless communication module 32. The storage portion 33 thereby always stores the up-to-date manipulation state information while the communication line is established between the communication device 10 and the mobile communication terminal 30.

While the communication line is established, the communication device 10 transmits the output timing specification information that specifies "instant to separate the mobile communication terminal 30 from the vehicle" as output timing. If the output timing specification information is corrected, the communication device 10 transmits the corrected output timing specification information. The control portion 31 rewrites the output timing specification information stored in the storage portion 33 each time the control portion 31 receives the output timing specification information via the wireless communication module 32. The storage portion 33 thereby always stores the up-to-date output timing specification information while the communication line is established between the communication device 10 and the mobile communication terminal 30.

Figure 4:
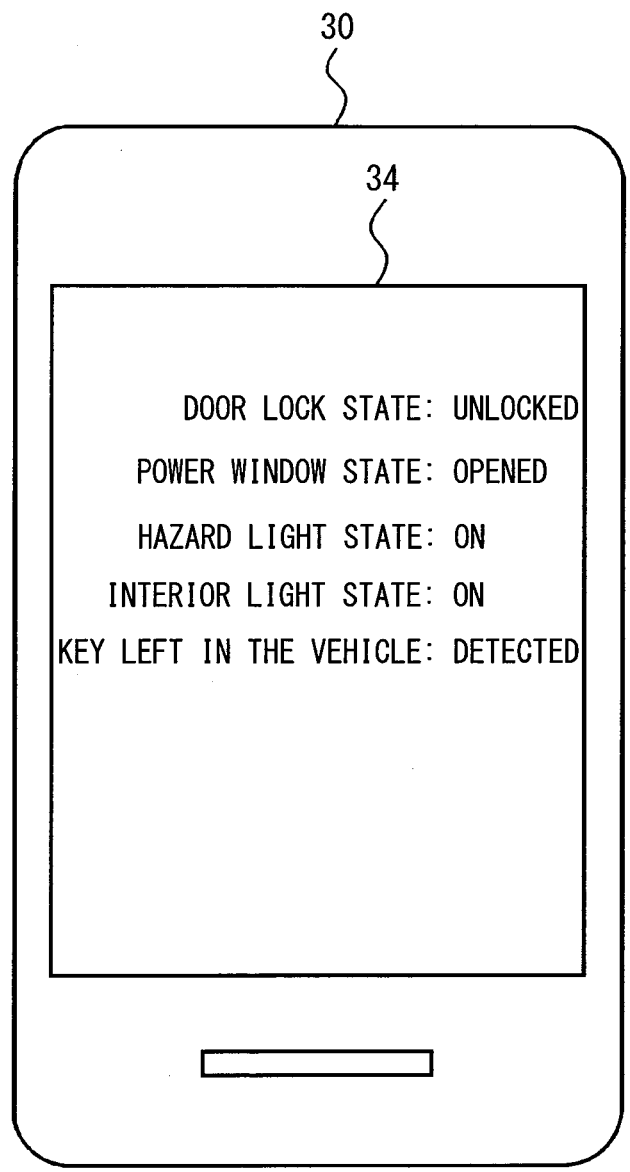
FIG. 4 is a front view illustrating a mobile communication terminal to output examples of accessory manipulation states.

The display output portion 34 includes a liquid crystal display instrument or an organic EL display instrument, for example. The display output portion 34 displays various types of information based on a display instruction signal supplied from the control portion 31. The screen of the display output portion 34 is provided with a touch-screen switch according to the known pressure sensitive type, electromagnetic induction type, capacitance type, or a combination of these types. As illustrated in FIG. 4, for example, the display output portion 34 displays states of manipulation on vehicular accessories based on the manipulation state information stored in the storage portion 33.

The display output portion 34 displays an accessory manipulation state at the timing that is specified based on the output timing specification information stored in the storage portion 33. In this case, the output timing specification information basically specifies "instant to separate the mobile communication terminal 30 from the vehicle" as output timing. In addition, the "instant to separate the mobile communication terminal 30 from the vehicle" corresponds to "instant to forcibly disconnect the communication line" based on the additional information. Therefore, the display output portion 34 basically displays an accessory manipulation state when the communication line connected to the communication device 10 is forcibly disconnected.

The position detection portion 35 includes an unshown GPS receiver according to the known technology. The position detection portion 35 acquires position information about the mobile communication terminal 30 based on a detection signal supplied from the GPS receiver and outputs the position information to the control portion 31.

The following describes example operations of the communication device 10 and the mobile communication terminal 30 according to the above-mentioned configuration. The control portion 11 and the control portion 31 mainly perform the following operations. For convenience of explanation, however, the communication device 10 and the mobile communication terminal 30 are assumed to perform the operations.

(Example Control when Correlation Data RD is not Corrected)

Figure 5:
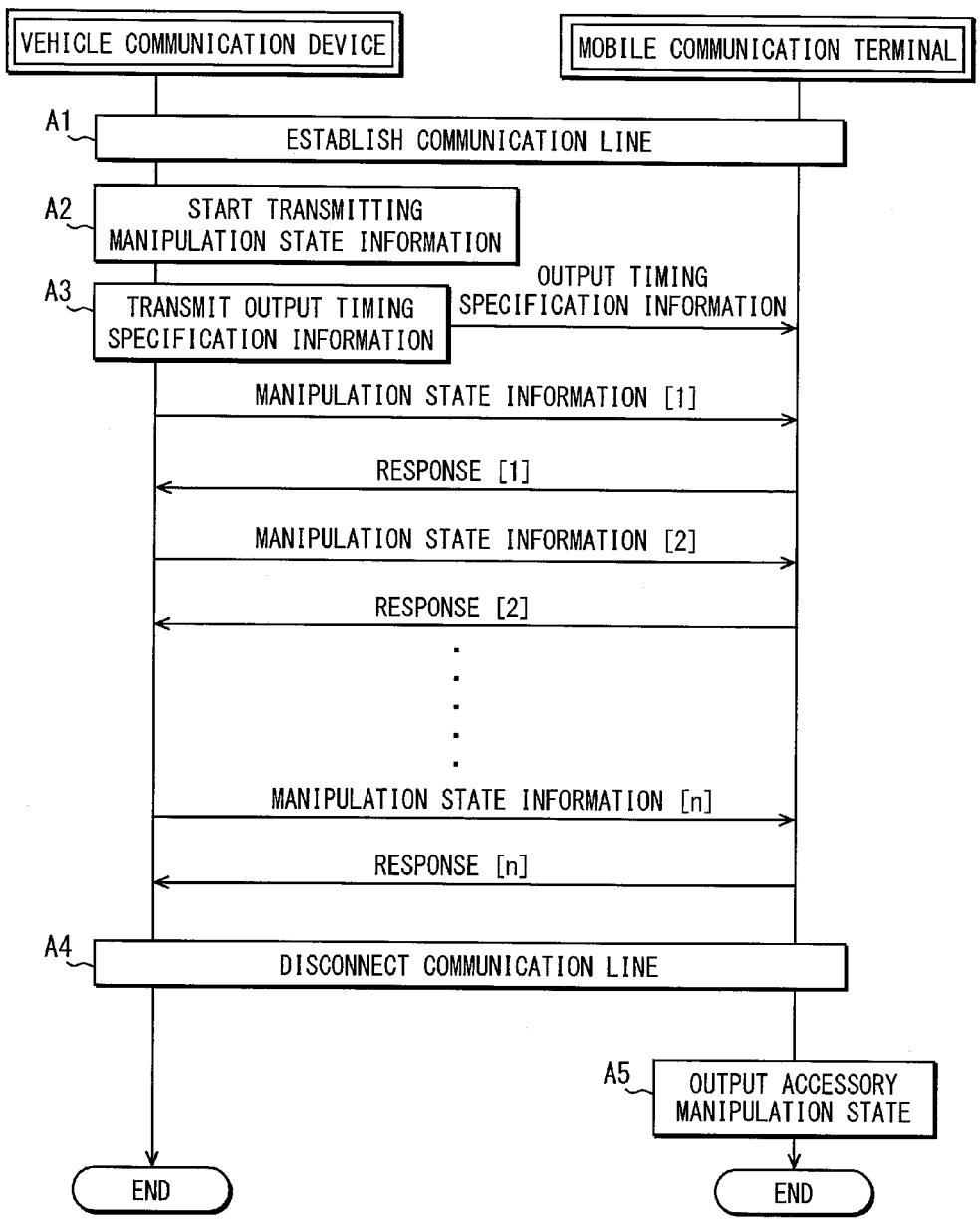
FIG. 5 is a flowchart illustrating an example control when correlation data is not corrected.

In this case, as illustrated in FIG. 5, a communication line is established with the mobile communication terminal 30 (A1). The communication device 10 starts transmitting manipulation state information (A2). After starting a process to transmit the manipulation state information, the communication device 10 repeatedly transmits the up-to-date manipulation state information. The mobile communication terminal 30 stores the received manipulation state information in the storage portion 33 each time the mobile communication terminal 30 receives the manipulation state information from the communication device 10. In addition, the mobile communication terminal 30 transmits a response signal indicating reception of the manipulation state information to the communication device 10.

After the communication line is established with the mobile communication terminal 30 (A1), the communication device 10 transmits output timing specification information to the mobile communication terminal 30 (A3). In this case, the output timing specification information specifying "instant to forcibly disconnect the communication line" as output timing, namely, "instant to separate the mobile communication terminal 30 from the vehicle" is transmitted to the mobile communication terminal 30. The output timing specification information may be transmitted after the communication line is established until it is disconnected. However, it may be favorable to transmit the output timing specification information at as early timing as possible after the communication line is established. This is because it is difficult to estimate when the communication line is disconnected.

The communication device 10 repeatedly transmits the up-to-date manipulation state information to the mobile communication terminal 30 until the communication line connected to the mobile communication terminal 30 is disconnected. The communication line is forcibly disconnected (A4). The mobile communication terminal 30 then outputs an accessory manipulation state (A5) based on the up-to-date manipulation state information stored in the storage portion 33 at output timing specified in the output timing specification information stored in the storage portion 33, namely, the timing the communication line is forcibly disconnected in this example. In this case, the mobile communication terminal 30 basically allows the display output portion 34 to visually output the accessory manipulation state. The mobile communication terminal 30 may audibly output the accessory manipulation state using an unshown speaker provided for the mobile communication terminal 30. The mobile communication terminal 30 may drive an unshown vibrator provided for the mobile communication terminal 30 and use the vibration to notify the user that the accessory manipulation state is output. The mobile communication terminal 30 may drive an unshown indicator or LED provided for the mobile communication terminal 30 and use the steady or flashing light to notify the user that the accessory manipulation state is output.

The communication device 10 forcibly disconnects the communication line when radio field intensity S for wireless communication between the communication device 10 and the mobile communication terminal 30 goes lower than the specified threshold value K. As illustrated in FIG. 2, the mobile communication terminal 30 notifies an accessory manipulation state when radio field intensity S goes lower than the threshold value K, namely, the distance between the communication device 10 and the mobile communication terminal 30 reaches D1. The threshold value K may be favorably adjusted as needed so as to forcibly disconnect the communication line while the mobile communication terminal 30 is located within optimal notification area R1 as illustrated in FIG. 3.

(Example Control when Correlation Data RD is Corrected)

Figure 3:
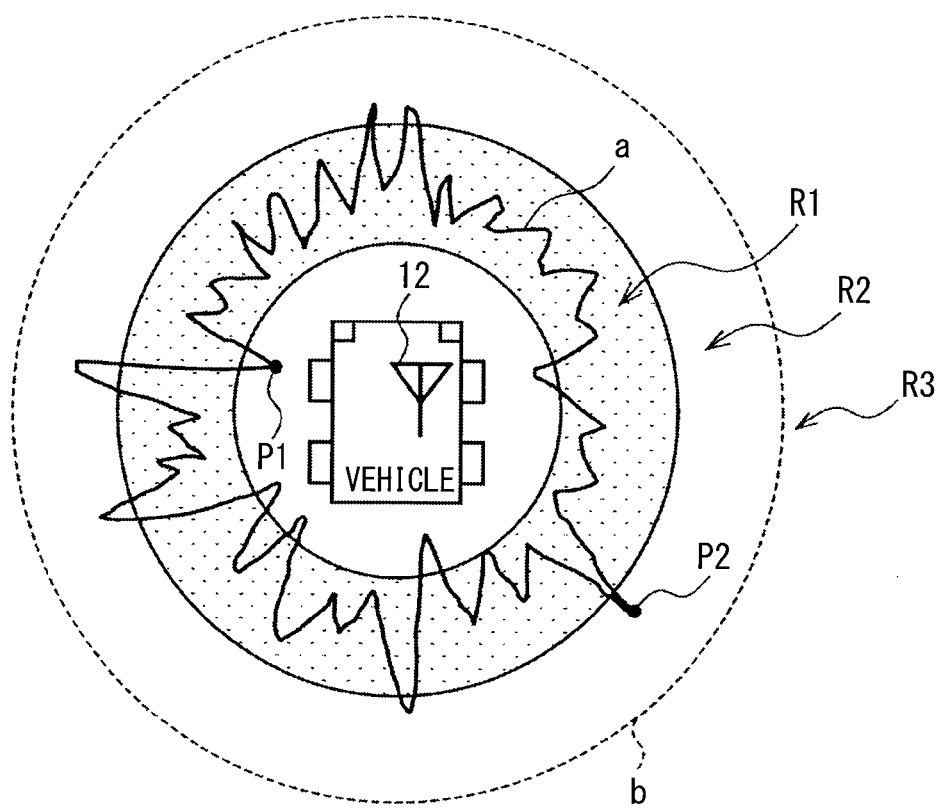
FIG. 3 is a diagram visually illustrating a radio field intensity distribution line, an optimal notification area, an allowable notification area, and a limit area around a vehicle.

As illustrated in FIG. 3, radio field intensity distribution line a represents the distribution of radio field intensity S around the vehicle for wireless communication between the communication device 10 and the mobile communication terminal 30. The distribution of radio field intensity S does not always fit into optimal notification area R1 available for accessory manipulation states. The communication line may be disconnected at position P1 or P2 outside area R1. The user may not be notified of an accessory manipulation state within optimal notification area R1 if an accessory manipulation state is output simply at the timing when the communication line is disconnected as described above. This is because the communication line may be disconnected at a position outside optimal notification area R1. It may be favorable to more accurately detect "separation of the mobile communication terminal 30 from the vehicle" in addition to or instead of detecting "separation of the mobile communication terminal 30 from the vehicle" based on the communication line disconnection.

In FIG. 3, an area inside radio field intensity distribution line a representing the distribution of radio field intensity S maintains the established communication line. An area outside radio field intensity distribution line a forcibly disconnects the communication line. The radio field intensity distribution line may be used as a boundary to automatically disconnect the communication line. It may be favorable to notify an accessory manipulation state after the user carrying the mobile communication terminal 30 leaves the vehicle and moves some distance in the direction separating from the vehicle. Optimal notification area R1 assumes the presence of a user carrying the mobile communication terminal 30. As illustrated in FIG. 6, optimal notification area R1 is favorably configured after the ACC switch 221 changes from "on state" to "off state," the door open/close switch 227 changes from "on state" to "off state," namely, from "opened state" to "closed state," specified time t1 elapses, and before specified time t2 elapses. In this case, the communication device 10 detects "separation of the mobile communication terminal 30 from the vehicle" when the ACC switch 221 turns off and the door is temporarily opened and then is closed (opening and closing the door).

In FIG. 6, specified time t1 is estimated for the user carrying the mobile communication terminal 30 to consume when he or she leaves the vehicle, moves at average travel speed V in the direction separating from the vehicle, and reaches optimal notification area R1 illustrated in FIG. 3. Specified time t1 is hereinafter referred to as "optimal minimum time t1."

Specified time t2 is estimated for the user carrying the mobile communication terminal 30 to consume when he or she leaves the vehicle, moves at average travel speed V in the direction separating from the vehicle, exits from optimal notification area R1 in FIG. 3, and reaches allowable notification area R2 outside optimal notification area R1. Specified time t2 is hereinafter referred to as "optimal maximum time t2."

Specified time t3 is estimated for the user carrying the mobile communication terminal 30 to consume when he or she leaves the vehicle, moves at average travel speed V in the direction separating from the vehicle, exits from allowable notification area R2 in FIG. 3, and reaches limit area R3 outside allowable notification area R2. Specified time t3 is hereinafter referred to as "limit time t3."

Boundary b between allowable notification area R2 and limit area R3 represents the limit where adding correction time to the output timing is considered effective during an output timing correction process to be described in detail later. In other words, adding correction time to the output timing is effective if the mobile communication terminal 30 is located inside boundary b. Adding correction time to the output timing is almost or completely ineffective if the mobile communication terminal 30 is located outside boundary b.

The following describes an example configuration to more accurately detect "separation of the mobile communication terminal 30 from the vehicle."

A correction process illustrated in FIG. 7 forcibly disconnects the communication line within optimal notification area R1 and allows the mobile communication terminal 30 to notify an accessory manipulation state even if the radio field intensity is not normal.

As illustrated in FIG. 7, for example, radio field intensity s1 is lower than normal radio field intensity S illustrated in FIG. 2. Distance D2 allows radio field intensity s1 to be lower than the threshold value K and is shorter than distance D1 illustrated in FIG. 2. Therefore, the mobile communication terminal 30 may notify an accessory manipulation state inside optimal notification area R1. To solve this problem, the control portion 11 corrects the threshold value K to a threshold value k1 so that the distance to cause radio field intensity s1 to be lower than the threshold value equals or approximates distance D1. Even if the radio field intensity goes lower than the normal, the communication line is forcibly disconnected when the distance between the communication device 10 and the mobile communication terminal 30 equals or approximates D1. The mobile communication terminal 30 can notify an accessory manipulation state within optimal notification area R1.

As illustrated in FIG. 7, for example, radio field intensity s2 is higher than normal radio field intensity S illustrated in FIG. 2. Distance D3 allows radio field intensity s2 to be lower than the threshold value K and is longer than distance D1 illustrated in FIG. 2. Therefore, the mobile communication terminal 30 may notify an accessory manipulation state outside optimal notification area R1. To solve this problem, the control portion 11 corrects the threshold value K to a threshold value k2 so that the distance to cause radio field intensity s2 to be lower than the threshold value equals or approximates distance D1. Even if the radio field intensity goes higher than the normal, the communication line is forcibly disconnected when the distance between the communication device 10 and the mobile communication terminal 30 equals or approximates D1. The mobile communication terminal 30 can notify an accessory manipulation state within optimal notification area R1.

Figure 8A:
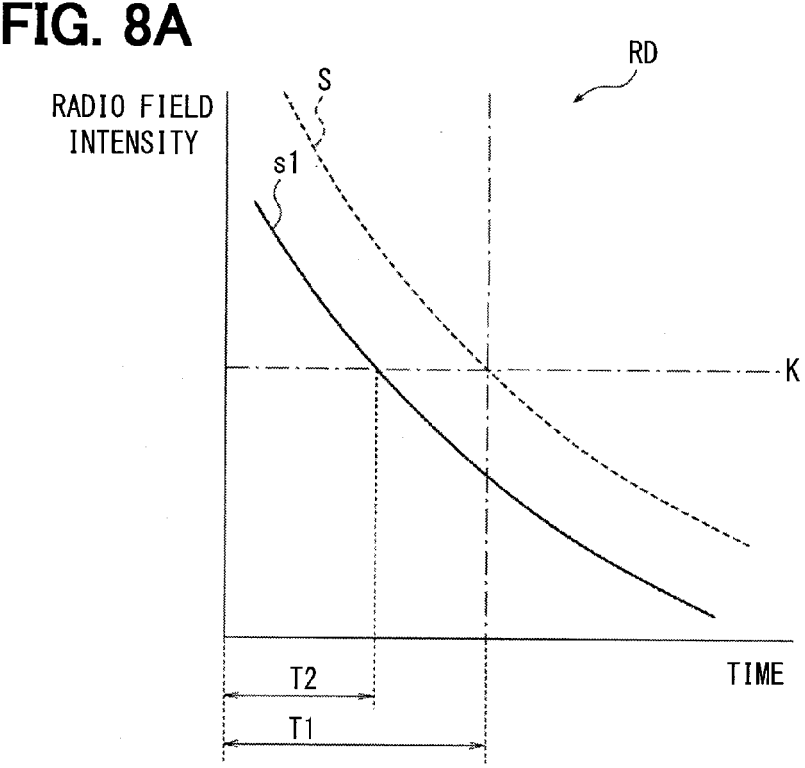
FIG. 8A is a graph illustrating a state before correcting the time axis for correlation data.
Figure 8B:
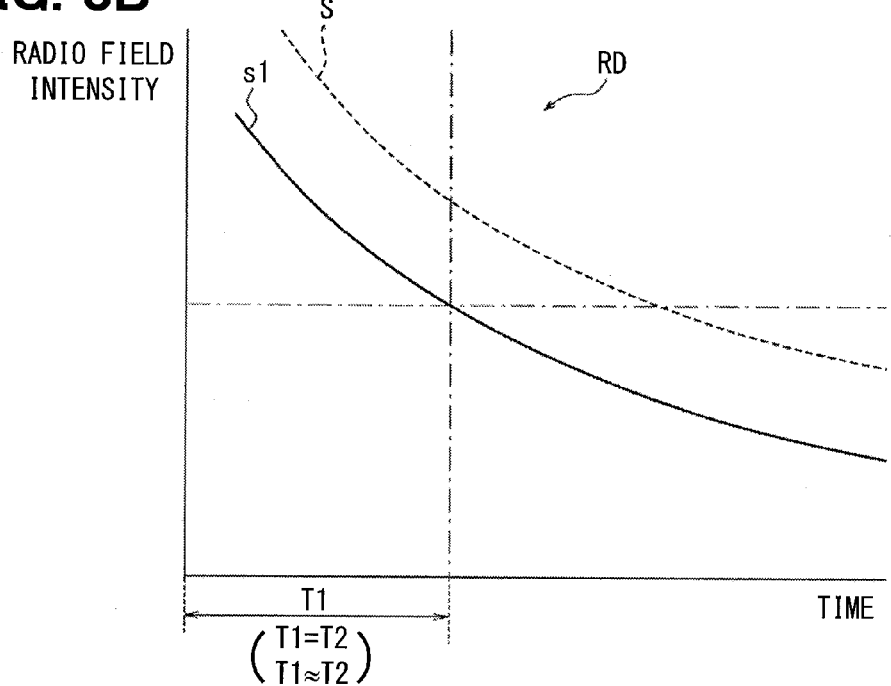
FIG. 8B is a graph illustrating a state after correcting the time axis for correlation data.

Correction processes illustrated in FIGS. 8A and 8B are based on a capability of converting the distance axis in FIG. 7 into a time axis. As illustrated in FIG. 8A, the distance axis for correlation data RD in FIG. 7 can be converted into the time axis based on average travel speed V for the user carrying the mobile communication terminal 30. In this case, the converted time axis represents the time elapsed from when the mobile communication terminal 30 separates from the vehicle.

As illustrated in FIG. 8A, radio field intensity s1 is lower than normal radio field intensity S illustrated in FIG. 2. In this case, time T2 causing radio field intensity 51 to be lower than the threshold value K is shorter than time T1 causing normal radio field intensity S to be lower than the threshold value K. Therefore, the mobile communication terminal 30 may notify an accessory manipulation state inside optimal notification area R1. In this case, the communication device 10 is configured to forcibly disconnect the communication line when time T1 elapses after the mobile communication terminal 30 separates from the vehicle.

As illustrated in FIG. 8B, the control portion 11 corrects to extend the time axis scale so that time T2 equals or approximates time T1. Even if the radio field intensity goes lower than the normal, the communication line is forcibly disconnected when the time elapsed from separation of the mobile communication terminal 30 from the vehicle equals or approximates time T1 assumed for the normal state. The mobile communication terminal 30 can notify an accessory manipulation state within optimal notification area R1.

Though a detailed illustration is omitted, the radio field intensity may be higher than normal radio field intensity S. In such a case, the time causing the radio field intensity to be lower than the threshold value K is longer than time T1 causing normal radio field intensity S to be lower than the threshold value K. Therefore, the mobile communication terminal 30 may notify an accessory manipulation state outside optimal notification area R1. To solve this problem, the control portion 11 corrects to compress the time axis scale so that the time longer than normal time T1 equals or approximates time T1. Even if the radio field intensity goes higher than the normal, the communication line is forcibly disconnected when the time elapsed from separation of the mobile communication terminal 30 from the vehicle equals or approximates time T1 assumed for the normal state. The mobile communication terminal 30 can notify an accessory manipulation state within optimal notification area R1.

Figure 9:
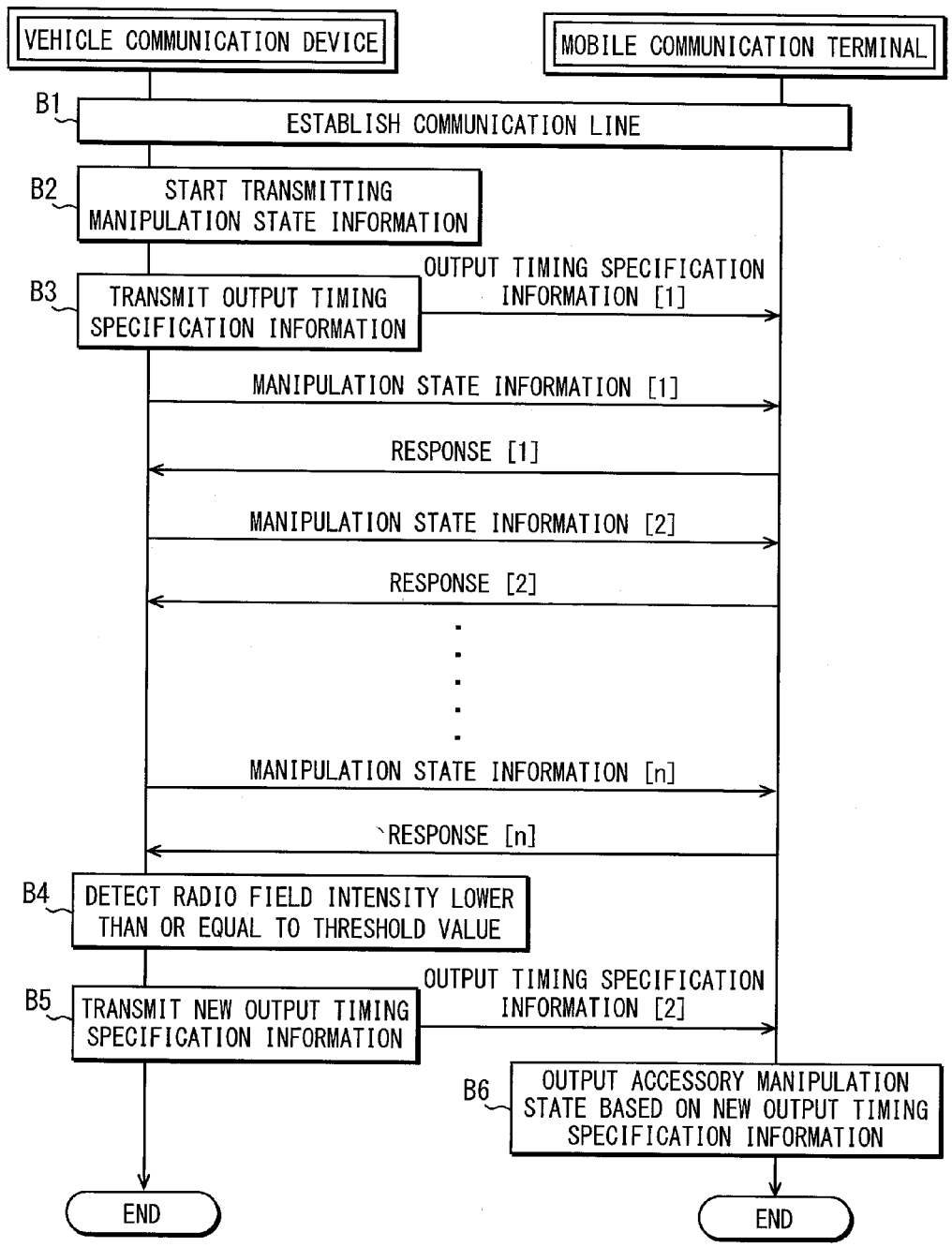
FIG. 9 is a flowchart illustrating an example control to correct correlation data.

FIG. 9 illustrates example control when correlation data RD is corrected as described above. The communication device 10 establishes a communication line with the mobile communication terminal 30 (B1). The communication device 10 starts transmitting manipulation state information (B2). The communication device 10 transmits output timing specification information (B3) and then determines whether or not correlation data RD is corrected. When correlation data RD is corrected, the communication device 10 detects that the corrected correlation data RD indicates the radio field intensity lower than or equal to a threshold value (B4). The communication device 10 newly generates output timing specification information specifying the time point as output timing and transmits the new output timing specification information to the mobile communication terminal 30 (B5). The output timing specification information already stored in the mobile communication terminal 30 is thereby corrected to the new output timing specification information. The mobile communication terminal 30 receives the output timing specification information and immediately outputs an accessory manipulation state (B6) based on the newly received corrected output timing specification information instead of the output timing specification information already stored in the storage portion 33.

Figure 10:
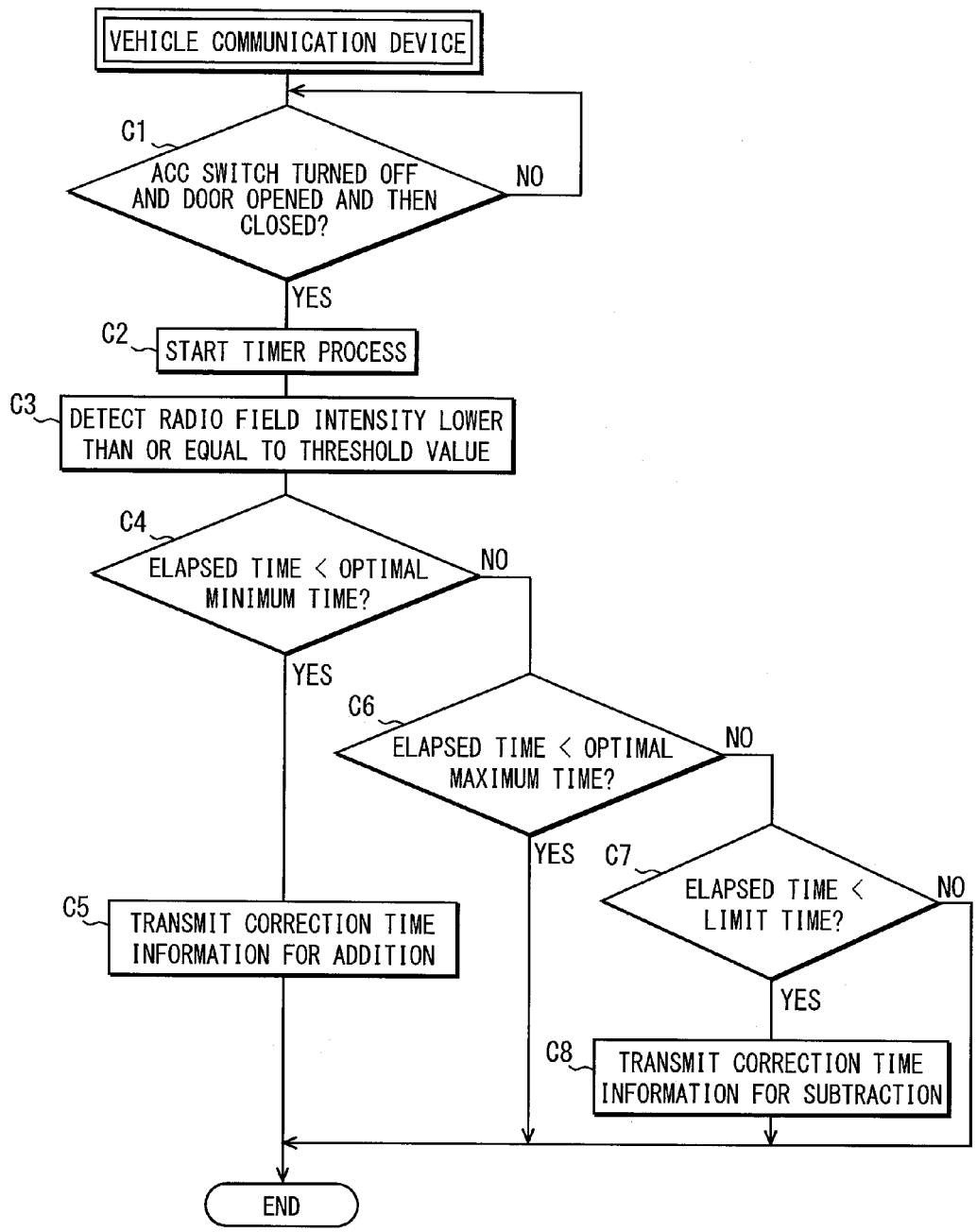
FIG. 10 is a flowchart illustrating an example control to correct new output timing.

The communication device 10 can correct new output timing specified by the newly generated output timing specification information based on the time elapsed from when the mobile communication terminal 30 separates from the vehicle. FIG. 10 illustrates example control when new output timing is corrected.

The ACC switch 221 turns off and the door is opened and then closed (YES at C1). The communication device 10 then starts the timer process performed by the timer portion 15 (C2). The timer portion 15 measures time T elapsed from when the ACC switch 221 turns off and the door is opened and then closed. In this case, the communication device 10 assumes the mobile communication terminal 30 to start moving in the direction separating from the vehicle under the condition that the ACC switch 221 turns off and the door is opened and then closed.

The communication device 10 detects that the corrected correlation data RD indicates the radio field intensity lower than or equal to a threshold value (C3). The communication device 10 compares time T measured by the timer portion 15 up to the time point with optimal minimum time t1 (C4). In this case, C3 corresponds to B4 described above.

Elapsed time T may be shorter than optimal minimum time t1 (YES at C4). In this case, the communication device 10 transmits correction time information Ia indicating correction time Ha for addition as well as the new output timing specification information to the mobile communication terminal 30 (C5) and terminates the control. The mobile communication terminal 30 receives the new output timing specification information and correction time information Ia and outputs an accessory manipulation state at the timing corresponding to correction time Ha later than the output timing after the correction specified in the new output timing specification information.

If elapsed time T is longer than or equal to optimal minimum time t1 (NO at C4), the communication device 10 compares elapsed time T with optimal maximum time t2 (C6). Elapsed time T may be shorter than optimal maximum time t2, namely, may be longer than or equal to t1 and may be shorter than optimal maximum time t2 (YES at c6). In this case, the communication device 10 terminates the process without transmitting the correction time information to the mobile communication terminal 30.

If elapsed time T is longer than or equal to optimal maximum time t2 (NO at C6), the communication device 10 compares elapsed time T with limit time t3 (C7). Elapsed time T may be shorter than limit time t3, namely, may be longer than or equal to optimal maximum time t2 and may be shorter than limit time t3 (YES at c7). In this case, the communication device 10 transmits the new output timing specification information and correction time information Ib indicating correction time Hb for subtraction to the mobile communication terminal 30 (C8) and terminates the process. The mobile communication terminal 30 receives the new output timing specification information and correction time information Ib and outputs a manipulation state at the timing corresponding to correction time Ha earlier than the output timing after the correction specified in the new output timing specification information. If elapsed time T is longer than or equal to limit time t3 (NO at C7), the communication device 10 terminates the process without transmitting the correction time information to the mobile communication terminal 30.

According to the above-mentioned embodiment, the vehicle communication device 10 transmits the output timing specification information to the mobile communication terminal 30 while the communication line is established. The mobile communication terminal 30 outputs an accessory manipulation state at the timing specified in the output timing specification information, namely, at the "instant to separate the mobile communication terminal 30 from the vehicle." The mobile communication terminal 30 outputs a state of manipulation on a vehicular accessory based on the manipulation state information, namely, notifies the user of failed manipulation (manipulation state) on a vehicular accessory at the given timing. This timing can be defined as an "instant to separate the mobile communication terminal 30 from the vehicle," namely, when the user carrying the mobile communication terminal 30 appropriately separates from the vehicle. The user can be notified of an accessory manipulation state at appropriate timing while the mobile communication terminal 30 carried by the user is located within optimal notification area R1. Based on the notified manipulation state, the user can determine whether or not the manipulation on the accessory failed.

Basically, the communication device 10 detects "disconnection of the communication line" from the mobile communication terminal 30 as the "instant to separate the mobile communication terminal 30 from the vehicle." The communication terminal 30 notifies an accessory manipulation state when the user carrying the mobile communication terminal 30 gradually separates from the vehicle to disconnect the communication line. The user can be notified of failed manipulation at appropriate timing when the user separates from the vehicle so as to disconnect the communication line.

The communication device 10 can also detect separation of the mobile communication terminal from the vehicle based on at least one of the radio field intensity for wireless communication with the mobile communication terminal, the distance between the vehicle and the mobile communication terminal, and the time elapsed from when at least one of vehicular accessories turns off. This enables to more accurately detect "separation of the mobile communication terminal 30 from the vehicle." The user can be notified of failed manipulation at more appropriate timing.

The communication device 10 transmits the up-to-date manipulation state information to the mobile communication terminal 30 until disconnection of the communication line the communication line establishment portion 21 establishes with the mobile communication terminal 30. The mobile communication terminal 30 thereby always maintains the up-to-date manipulation state information. The mobile communication terminal 30 can notify the user of the up-to-date manipulation state, namely, an accessory manipulation state at the communication line disconnection regardless of when the communication line is disconnected at any time.

While there has been described the embodiment of the present disclosure, the disclosure is not limited to the above-mentioned embodiment but is applicable to various embodiments within the spirit and scope of the invention. It may be possible to combine the above-mentioned various detection processes and correction processes.

The communication device 10 can also detect "separation of the mobile communication terminal 30 from the vehicle" based on an actual distance between the vehicle (communication device 10) and the mobile communication terminal 30. In this case, for example, the position detection portion 35 detects actual position information about the mobile communication terminal 30. The mobile communication terminal 30 periodically transmits the position information to the communication device 10. The communication device 10 detects "separation of the mobile communication terminal 30 from the vehicle" when the amount of positional change in the mobile communication terminal 30, namely, a travel distance of the mobile communication terminal 30 exceeds a predetermined amount. The communication device 10 may calculate an actual distance between the actual position of the communication device 10 detected by the position detection portion 14 and the actual position of the mobile communication terminal 30 based on the position information received from the mobile communication terminal 30. The communication device 10 may detect "separation of the mobile communication terminal 30 from the vehicle" when the calculated actual distance between the communication device 10 and the mobile communication terminal 30 exceeds a predetermined distance.

The radio field intensity may indicate a larger amount of variation than normally estimated according to a distance between the communication device 10 and the mobile communication terminal 30. For example, the user may hold the mobile communication terminal 30 so as to cover the wireless communication module 32. In such a case, the communication device 10 may be configured to correct correlation data RD or the threshold value K so as to cancel a larger amount of variation than estimated normally.

The communication device 10 may calculate an average value for the radio field intensity and may configure a correction amount for the threshold value K based on the average value.

Figure 11:
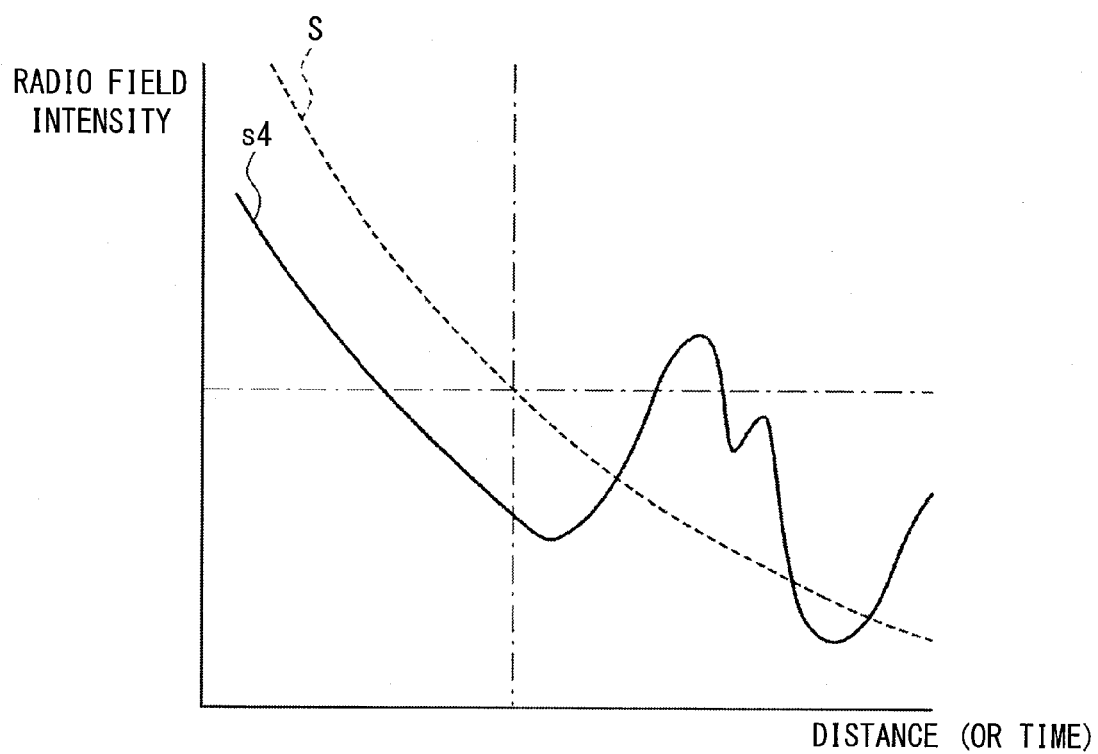
FIG. 11 is a graph illustrating an example state of instable radio field intensity.

For example, an object near the communication device 10 may reflect or absorb a radio wave. Alternatively, another communication instrument near the communication device 10 may generate a radio wave that interferes with the communication device 10. As illustrated in FIG. 11, for example, radio field intensity s4 may be unstable depending on environments around the communication device 10. If the radio field intensity is unstable, the communication device 10 may detect the radio field intensity several times for an appropriately lengthy period and change correction values for correlation data RD and the threshold value K as needed.

The communication device 10 may detect "separation of the mobile communication terminal 30 from the vehicle" based on a fact that a lock instruction signal is received from an unshown electronic key to remotely lock and unlock the door, that an unshown seating sensor changes from "on state" to "off state," or that an unshown intrusion detection sensor or infrared sensor turns on to detect intrusion into the vehicle, for example. The communication device 10 can detect "separation of the mobile communication terminal 30 from the vehicle" according to various configurations using various types accessories and sensors mounted on the vehicle.

The threshold value K specified for the communication device 10 is favorably larger than the radio field intensity to automatically disconnect the wireless communication (the marginal intensity capable of maintaining the communication line). The communication device 10 can thereby forcibly disconnect the wireless communication line before it is automatically disconnected. The communication device 10 can reliably transmit the output timing specification information to the mobile communication terminal 30 before the communication line is automatically disconnected. As illustrated in FIG. 12, the threshold value K is favorably specified to be larger than a threshold value Z indicating the radio field intensity to automatically disconnect the wireless communication. The communication device 10 can also detect an instant to automatically disconnect the communication line as the "instant to separate the mobile communication terminal 30 from the vehicle."

The door open/close switch 227 may turn off when the vehicle door is opened, and may turn on when the vehicle door is closed. In this case, the waveform pattern of the door open/close switch 227 illustrated in FIG. 6 is reversed.

The communication device 10 may determine an "instant to disconnect the communication line," namely, "instant to separate the mobile communication terminal 30 from the vehicle" based on the receiving sensitivity of a radio wave instead of the radio field intensity.

Even if the radio field intensity changes, the communication device 10 may ignore the change and may not perform various correction processes while the ACC switch 221 changes from "on state" to "off state" and the door open/close switch 227 changes from "on state" to "off state." Even if the ACC switch 221 changes from "on state" to "off state," the door is not opened or closed until the door open/close switch 227 changes from "on state" to "off state." Therefore, the user carrying the mobile communication terminal 30 is considered to be present in the vehicle compartment. The output timing may not be corrected appropriately when the radio field intensity changes in a situation where separation of the user from the vehicle is unpredictable. To solve this problem, no correction process is performed while ignoring a change in the radio field intensity even if the change occurs in a situation where separation of the user from the vehicle is unpredictable. More appropriate output timing can be notified to the mobile communication terminal 30.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle communication device comprising:
a communication line establishment device that establishes a communication line with a mobile communication terminal;
a manipulation state information transmission device that transmits manipulation state information indicating a manipulation state of a vehicular accessory to the mobile communication terminal, with which the communication line is established by the communication line establishment device;
an output timing specifying information generation device that generates output timing specifying information for specifying separation of the mobile communication terminal from the vehicle as an output timing for the mobile communication terminal to output the manipulation state information; and
an output timing specifying information transmission device that transmits the output timing specifying information generated by the output timing specifying information generation device to the mobile communication terminal.

2. The vehicle communication device according to claim 1, further comprising:
a detection device that detects disconnection of the communication line as the separation of the mobile communication terminal from the vehicle.

3. The vehicle communication device according to claim 2, wherein the detection device detects the separation of the mobile communication terminal from the vehicle based on at least one of:
a radio field intensity for wireless communication with the mobile communication terminal;
a distance between the vehicle and the mobile communication terminal; and
elapsed time from when at least one of vehicular accessories turns off.

4. The vehicle communication device according to claim 1 wherein, when the communication line establishment device establishes the communication line with the mobile communication terminal, the manipulation state information transmission device transmits latest manipulation state information to the mobile communication terminal until the communication line is disconnected.

* * * * *